United States Patent [19]

Smith

[11] Patent Number: 5,534,587

[45] Date of Patent: Jul. 9, 1996

[54] COLOR-CHANGEABLE MARKING COMPOSITION

[75] Inventor: Mark T. Smith, Waltham, Mass.

[73] Assignee: Avery Dennison Corporation, Pasadena, Calif.

[21] Appl. No.: 264,565

[22] Filed: Jun. 23, 1994

Related U.S. Application Data

[63] Continuation-in-part of Ser. No. 194,466, Feb. 10, 1994, abandoned, which is a continuation-in-part of Ser. No. 97,461, Jul. 27, 1993, abandoned, which is a continuation-in-part of Ser. No. 139,560, Oct. 20, 1993, abandoned, which is a continuation of Ser. No. 965,803, Oct. 23, 1992, abandoned.

[51] Int. Cl.$^6$ .............................. C08L 9/08; C08L 33/08; C09D 11/18
[52] U.S. Cl. ........................ 524/575; 524/556; 106/20 A; 106/22 B; 106/23 B; 523/160; 523/161
[58] Field of Search ................................ 106/19 A, 20 A, 106/21 A, 22 B, 23 B; 523/160, 161; 524/556, 575; 427/429

[56] References Cited

U.S. PATENT DOCUMENTS

| 4,365,035 | 12/1982 | Zabiak | 523/160 |
| 5,389,717 | 2/1995 | Santini et al. | 523/160 |

*Primary Examiner*—Peter A. Szekely
*Attorney, Agent, or Firm*—Kriegsman & Kriegsman

[57] ABSTRACT

A color-changeable marking composition well-suited for drawing and coloring activities. In a preferred embodiment, the composition comprises (a) an emulsion, the emulsion having an aqueous continuous phase characterized by a basic pH and a noncarboxylated styrene-butadiene rubber latex discontinuous phase; (b) a pigment insoluble in the aqueous continuous phase of the emulsion; and (c) an acid dye soluble in the aqueous continuous phase of the emulsion, the acid dye having a different color than the water-insoluble pigment. Upon contact with the surface of a conventional porous marking substrate, the emulsion breaks, causing the aqueous continuous phase to be absorbed by the substrate and the rubber latex discontinuous phase to form a cohesive film on the surface of the substrate. The acid dye, because of its solubility in the aqueous continuous phase, is also absorbed by the substrate and cannot readily be removed therefrom. The pigment, because of its insolubility in the aqueous continuous phase, becomes associated with the cohesive film and can easily be removed from the substrate by stripping the cohesive film from the substrate using an ordinary pencil eraser. Accordingly, if the cohesive film is not removed from the substrate, the mark reflects the color contribution of the pigment (or, in some cases, both the pigment and the dye) whereas, if the cohesive film is removed from the substrate, the mark reflects the color contribution of the dye only.

6 Claims, No Drawings

COLOR-CHANGEABLE MARKING COMPOSITION

CROSS-REFERENCES TO RELATED APPLICATIONS

The present application is a continuation-in-part of abandoned U.S. patent application Ser. No. 08/194,466, filed Feb. 10, 1994, which in turn is a continuation-in-part of pending U.S. patent application Ser. No. 08/097,461, filed July 27, 1993, now abandoned which in turn is a continuation-in-part of U.S. patent application Ser. No. 08/139,560, filed Oct. 20, 1993, which in turn is a file wrapper continuation of now abandoned U.S. patent application Ser. No. 07/965,803, filed Oct. 23, 1992, all of the above of which are herein incorporated by reference.

FIELD OF THE INVENTION

The present invention relates generally to marking compositions and more particularly to color-changeable marking compositions.

BACKGROUND OF THE INVENTION

A variety of differently colored marking media are commonly used for drawing and coloring activities. Such marking media include, for example, differently colored markers, crayons, pens, pencils and paints. Oftentimes, it is desirable to change the color of a mark made by the aforementioned marking media after said mark has been made. For instance, one may want to draw a yellow flower over a previously colored green field. Changing the color of a mark after it has been made cannot readily be done with conventional marking media. In the past, to attempt to change the color of a mark after it has been made, one typically places a second mark of a desired color over a first mark of an undesired color. This approach is rarely successful when employing conventional marking media as the first and second marks tend to smear together into a dark, undesirably-colored mark. In addition, when this approach to changing colors is attempted using porous-tip markers, the tip of the second-used marker often becomes soiled and ruined when it is brought into contact with the mark left by the first marker.

Therefore, there has been a long-felt need for marking compositions well-suited for coloring and drawing applications which produce marks of a first color that can readily be changed into a second color.

One proposed solution to the above-described problem is described in German Patent Specification No. 2,724,820, published Jan. 1975, the disclosure of which is incorporated herein by reference. This patent specification describes a color changing marking composition system which comprises a pair of markers. The first marker contains a bleach-sensitive dye of a first color combined with a bleach-stable dye of a second color. The second marker contains a clear bleach solution. In use, a mark is applied using the first marker, the mark typically being a blend of the first and second colors. The second marker is then used to write over that portion of the mark wished to be changed in color. When the clear bleach solution of the second marker comes into contact with the bleach-sensitive dye present in the overwritten portion of the mark, the color contribution of the bleach-sensitive is eliminated therefrom, leaving only the color contribution of the bleach-stable dye.

There are certain drawbacks to the aforementioned marking system. First, since one of the pair of markers contains only the bleaching agent, that bleaching marker cannot be used to render a visible mark and may only be used in combination with the dye-containing marker. Consequently, once the dye-containing marker is used up, there is no use for the bleaching marker. Alternatively stated, once the bleaching marker is used up, the dye-containing marker can only be used for the color in which it initially marks. Second, as the bleach-containing marker is applied over an existing mark, its porous tip tends to pick up and get soiled by the dyes present in the existing mark. As a result of such soiling, the bleaching marker often taints the color of subsequent marks to which it is applied.

Another approach to this problem is described in U.S. Pat. No. 5,232,494, which issued Aug. 3, 1993, the disclosure of which is incorporated herein by reference. This patent also describes a color changing composition system which comprises at least two marking instruments. The first marking instrument contains a first ink composition comprising a dye whose coloring ability is destroyed in the presence of a bleach and/or a pH of about 10 or greater. The second marking instrument contains a second ink, the second ink comprising (1) from about 1% to about 20% by weight of bleach; (2) from about 0.1% to about 10% by weight of a base; and (3) from about 0.1% to about 15% by weight of a colorant which maintains its characteristic color in the presence of a bleach and/or a pH of about 10 or greater.

One drawback to the approach disclosed in the foregoing patent is that two separate markers, each marker containing a different marking composition, must be used for a color-changeable mark to be made. Consequently, if one of the markers is lost or breaks, a mark of only one color can be made.

SUMMARY OF THE INVENTION

It is an object of the present invention to provide a novel color-changeable marking composition.

It is another object of the present invention to provide a color-changeable marking composition that overcomes at least some of the drawbacks associated with existing color-changeable marking compositions.

It is still another object of the present invention to provide a color-changeable marking composition that does not require the use of either two separate markers or two separate marking compositions to produce a mark of a first color and to change said mark into a mark of a second color, said second color being different from said first color.

It is still yet another object of the present invention to provide a color-changeable marking composition that does not require the use of bleach or other similar chemicals to change the color of a mark made thereby from a first color to a second color, said second color being different from said first color.

It is a further object of the present invention to provide a color-changeable marking composition as described above that can be embodied in many different types of marking media, such as markers, pens, paints, etc.

It is still a further object of the present invention to provide a color-changeable marking composition as described above that is easy to use and that can be used on conventional porous marking substrates. For purposes of the present specification and claims, the expression "conventional porous marking substrate" is defined to mean a marking substrate which is sufficiently porous to permit the penetration thereinto of colorants of the type typically found in conventional non-erasable inks and which is treated in such a manner that, when contacted with water, ions (e.g., protons and cations) are dissolved therefrom. Examples of conventional porous marking substrates include, but are not limited to, conventional stationery-type papers.

In furtherance of the above and other objects to be described or to become apparent below, a color-changeable marking composition well-suited for drawing and coloring activities is hereinafter provided, the color-changeable marking composition broadly comprising: (a) a carrier medium; (b) a first colorant present in said carrier medium, said first colorant being erasable with an ordinary pencil eraser from a conventional porous marking substrate to which said composition has been applied; and (c) a second colorant present in said carrier medium and different in color from said first colorant, said second colorant not being erasable with an ordinary pencil eraser from a conventional porous marking substrate to which said composition has been applied.

More specifically, the color-changeable marking composition of the present invention preferably comprises:

(a) an emulsion, said emulsion comprising a discontinuous polymeric phase and a continuous phase, said emulsion being characterized by its ability to be transformed, upon being contacted with the surface of a conventional porous marking substrate, from a first state in which the emulsion is stable to a second state in which the emulsion is unstable and the discontinuous polymeric phase rapidly agglomerates to form a deposit on the surface of the conventional porous marking substrate with low adhesion thereto;

(b) a first colorant present in said emulsion, said first colorant being characterized by its association with said deposit when said emulsion is transformed into said second state; and (c) a second colorant present in said emulsion and different in color from said first colorant, said second colorant being characterized both by its solubility in said continuous phase and by its lack of association with said deposit when said emulsion is transformed into said second state whereby, upon contact of said emulsion with the surface of the conventional porous marking substrate, said second colorant becomes absorbed by the conventional porous marking substrate.

For example, in a preferred embodiment, the color-changeable marking composition of the present invention comprises (a) an emulsion, the emulsion having an aqueous continuous phase characterized by a basic pH and a non-carboxylated styrenebutadiene rubber latex discontinuous phase; (b) a pigment insoluble in the aqueous continuous phase of the emulsion; and (c) an acid dye soluble in the aqueous continuous phase of the emulsion, the acid dye having a different color than the water-insoluble pigment.

To use the above-described composition to form a color-changeable mark, the composition is applied to the surface of a conventional porous marking substrate. Upon contact with the substrate, the emulsion breaks. As a result of the emulsion breaking, the aqueous continuous phase becomes absorbed by the substrate and the rubber latex discontinuous phase forms a cohesive film on the surface of the substrate. The acid dye, because of its solubility in the aqueous continuous phase, is also absorbed by the substrate and cannot readily be removed therefrom. The pigment, because of its insolubility in the aqueous continuous phase, becomes associated with the cohesive film and can easily be removed from the substrate by stripping the cohesive film from the substrate using an ordinary pencil eraser. Accordingly, if the cohesive film is not removed from the substrate, the mark reflects the color contribution of the pigment (or, in some cases, both the pigment and the dye) whereas, if the cohesive film is removed from the substrate, the mark reflects the color contribution of the dye only.

As can readily be appreciated, one advantage of the present invention over existing color changing compositions is that two different marking compositions are not necessary to make a mark of a first color and to change the mark to a second color. Instead, all that is needed is a single marking composition and an ordinary pencil eraser. Another advantage of the present invention over existing color changing compositions is that, once the mark has been changed from the first color to the second color by stripping the polymeric deposit from the substrate, one can reapply the composition over the remaining mark to change its color back to the first color from the second color. In fact, erasure of the polymeric deposit and reapplication of the composition over the remainder of the mark can be done reversibly and repeatedly any number of times to change the color of the mark between a first color and a second color.

Additional objects, features and advantages of the present invention will be set forth in part in the description which follows, and in part will be obvious from the description or may be learned by practice of the invention. These embodiments will be described in sufficient detail to enable those skilled-in the art to practice the invention, and it is to be understood that other embodiments may be utilized and that changes may be made without departing from the scope of the invention. The following detailed description is, therefore, not to be taken in a limiting sense, and the scope of the present invention is best defined by the appended claims.

DETAILED DESCRIPTION OF PREFERRED EMBODIMENTS

The present invention is directed to a novel color-changeable marking composition which, when applied to a conventional porous marking substrate, makes a mark of one color and which, when subjected thereafter to the rubbing action of an ordinary pencil eraser, changes to a mark of a second color.

In accordance with the teachings of the present invention, a composition of the type described above may be made, for example, by modifying existing and/or previously described compositions which include a colorant that is erasable with an ordinary pencil eraser from conventional porous marking substrates to include an additional colorant which, when incorporated into said composition, cannot be erased with an ordinary pencil eraser. In this manner, if the composition is applied to a conventional porous marking substrate and the erasable colorant is not removed from the substrate, the mark reflects the color contribution of both the erasable (and, in some instances, both the erasable and the non-erasable) colorants. If, however, the composition is applied to a conventional porous marking substrate and the erasable colorant is thereafter removed from the substrate using an ordinary pencil eraser, the mark reflects the color contribution of the non-erasable colorant only.

Ink compositions which include a colorant that is erasable with an ordinary pencil eraser from conventional porous marking substrates and which are usable in the present invention are disclosed in the following patents and publications, all of which are incorporated herein by reference: U.S. Pat. No. 4,297,260, inventors Ferree, Jr. et al., which issued Oct. 27, 1981; U.S. Pat. No. 5,217,255, inventors Lin et al., which issued Jun. 8, 1993; U.S. Pat. No. 5,203,913, inventors Yamamoto et al., which issued Apr. 20, 1993; U.S. Pat. No. 4,596,846, inventors Bohne et al., which issued Jun. 24, 1986; U.S. Pat. No. 5,120,359, inventors Uzukawa et al., which issued Jun. 9, 1992; U.S. Pat. No. 4,721,739, inventors Brenneman et al., which issued Jan. 26, 1988; U.S. Pat. No. 4,389,499, inventor Riesgraf, which issued Jun. 21, 1983; U.S. Pat. No. 4,390,646, inventor Ferguson, which issued Jun. 28, 1983; U.S. Patent No. 4,391,927, inventor Farmer, III, which issued Jul. 5, 1983; U.S. Pat. No. 4,687,791, inventors Miyajima et al., which issued Aug. 18, 1987; U.S. Pat. No. 4,738,725, inventors Daugherty et al., which issued Apr. 19, 1988; U.S. Pat. No. 4,760,104, inventors Miyajima et al., which issued Jul. 26, 1988; Japanese Patent No. 5-214285, inventors Kouji et al., which issued Aug. 24, 1993; PCT Application No. PCT/US92/11127, inventor Loftin, which was published Jun. 24, 1993; Canadian Patent Application No. 2,076,318, inventors Santini et al., which was published Aug. 24, 1993; and European Patent Application 556,668, inventors Koji et al., which was published Aug. 25, 1993.

Virtually all of the above-referenced erasable ink compositions comprise a polymeric film-forming or powder-forming material and a colorant, the polymeric material and the colorant typically being incorporated into an emulsion. The particulars of the polymeric material, the colorant and the emulsion vary widely in the various compositions; however, as a general principle, the polymeric material, the colorant and the emulsion are usually selected so that, when the composition is applied to a conventional porous marking substrate, the emulsion breaks causing (1) the continuous phase of the emulsion either to evaporate or to be absorbed by the substrate, (2) the polymeric material to form a deposit in the form of a powder or a cohesive film on the surface of the substrate and (3) the colorant to associate itself with the deposit, as opposed to being absorbed by the porous substrate. As a result, the colorant can readily be removed from the substrate by stripping the deposit from the surface of the substrate using an ordinary pencil eraser.

To promote association of the colorant with the polymeric material, many of the above-referenced compositions have exploited either (a) a charge attraction between the colorant and the polymeric material (see, for example, U.S. Pat. No. 4,297,260 to Ferree, Jr. et al. wherein a positively-charged, water-soluble basic dye is used in combination with a negatively-charged, carboxylated styrene-butadiene copolymer) or (b) a common hydrophobicity or hydrophilicity of the colorant and the polymeric material relative to the continuous phase of their corresponding emulsion (see, for example, published PCT Application No. PCT/US92/11127 wherein an aqueous emulsion comprising a water-insoluble pigment and a non-carboxylated styrene-butadiene copolymer is used).

Based on the foregoing considerations, it can be seen that the nature of the non-erasable colorant will be dependent, in most instances, upon the particulars of the emulsion, polymeric material and erasable colorant with which it is combined. In other words, a suitable non-erasable colorant should be soluble in the continuous phase of the emulsion and should not be attracted to or associate with either the polymeric deposit-forming material or the erasable colorant to ensure that the non-erasable colorant will be absorbed by the conventional porous marking substrate when the composition is applied thereto and the emulsion breaks. To illustrate, a water-soluble acid dye would be a good non-erasable colorant for use in an erasable composition comprising an aqueous emulsion of basic pH which includes a non-carboxylated styrene-butadiene copolymer and a water-insoluble pigment. Similarly, a water-soluble basic dye would be a good non-erasable colorant for use in an erasable composition comprising an aqueous emulsion of acid pH which includes an acrylic polymer and a water-insoluble pigment. However, the aforementioned acid dye would not be a good non-erasable colorant for the aforementioned acrylic emulsion nor would the aforementioned basic dye be a good non-erasable colorant for the aforementioned styrene-butadiene emulsion.

As can readily be appreciated, if one wishes to see a change in the color of a mark after removal of the erasable colorant, black colorants and similarly dark colorants should not ordinarily be used as the non-erasable colorant.

The color-changeable marking composition of the present invention may additionally include additives of the type commonly employed in marking compositions. Such additives include, but are not limited to, humectants, preservatives, coalescing agents, plasticizers, antimicrobial agents, antifoam agents, anti-corrosive agents, antioxidants, release agents, surfactants and the like. Examples of the aforementioned additives are disclosed in the patents, publications and patent applications incorporated herein by reference.

The color-changeable marking composition of the present invention can have a viscosity anywhere in the range from about 1–10 cps for markers, from about 10 cps to several thousand cps for ball-point pens and from several thousand cps upwards for paints. Thickeners (both thixotropic and Newtonian) may be used to adjust the viscosity of the composition. Examples of suitable viscosity adjusting agents are disclosed in U.S. Pat. Nos. 5,217,255, 5,013,361, 4,671,691, 4,686,246, 4,786,198 and 4,471,079, all of which are herein incorporated by reference.

The following examples are illustrative only and should in no way limit the scope of the present invention:

EXAMPLE I

A 1 g quantity of Carolina Color Chemical CARACID Rose 2 GLA (ACID Red 1) was added to an aqueous solution consisting of 1 g triethanolamine in water. Next, a 20 g quantity of Dayglo EP 17 Yellow pigment dispersion was added to a 50 g quantity of BASF Butanol 103 non-carboxylated styrene-butadiene latex emulsion. The foregoing acid dye-containing solution was then added to the above-described pigment-containing emulsion. The resulting composition, which was a low viscosity ink (i.e., less than 10 cps), was then applied to a sheet of conventional stationery-type paper using a porous tip marker. As applied, the mark appeared orange due to the combined color contributions of the yellow and rose colorants. Upon erasure of the rubber film and yellow colorant associated therewith using an ordinary pencil eraser, the mark appeared red, reflecting only the color contribution of the non-erasable red colorant.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A color-changeable marking composition comprising:
   (a) an emulsion, said emulsion comprising a discontinuous polymeric, film-forming phase and a continuous phase, said emulsion being characterized by its ability to be transformed, upon being contacted with the surface of a conventional porous marking substrate, from a first state in which the emulsion is stable to a second state in which the emulsion is unstable and the discontinuous polymeric, film-forming phase rapidly agglomerates to form a film deposited on the surface of the conventional porous marking substrate with low adhesion thereto, said emulsion being an aqueous emulsion of non-carboxylated styrene-butadiene rubber latex characterized by a basic pH;

(b) a first colorant present in said emulsion, said first colorant being characterized by its association with said film when said emulsion is transformed into said second state, said first colorant being a water-insoluble pigment; and (c) a second colorant present in said emulsion and different in color from said first colorant, said second colorant being characterized both by its solubility in said continuous phase and by its lack of association with said film when said emulsion is transformed into said second state whereby, upon contact of said emulsion with the surface of the conventional porous marking substrate, said second colorant becomes absorbed by the conventional porous marking substrate, said second colorant being a water-soluble acid dye.

2. A color-changeable marking composition comprising:

(a) an emulsion, said emulsion comprising a discontinuous polymeric, film forming phase and a continuous phase, said emulsion being characterized by its ability to be transformed, upon being contacted with the surface of a conventional porous marking substrate, from a first state in which the emulsion is stable to a second state in which the emulsion is unstable and the discontinuous polymeric, film-forming phase rapidly agglomerates to form a film deposited on the surface of the conventional porous marking substrate with low adhesion thereto, said emulsion being an aqueous emulsion of non-carboxylated styrene-butadiene rubber latex characterized by a basic pH;

(b) a first colorant present in said emulsion, said first colorant being characterized by its association with said film when said emulsion is transformed into said second state, said first colorant being a water-soluble basic dye; and (c) a second colorant present in said emulsion and different in color from said first colorant, said second colorant being characterized both by its solubility in said continuous phase and by its lack of association with said film when said emulsion is transformed into said second state whereby, upon contact of said emulsion with the surface of the conventional porous marking substrate, said second colorant becomes absorbed by the conventional porous marking substrate, said second colorant being a water-soluble acid dye.

3. A color-changeable marking composition comprising:

(a) an emulsion, said emulsion comprising a discontinuous polymeric, film-forming phase and a continuous phase, said emulsion being characterized by its ability to be transformed, upon being contacted with the surface of a conventional porous marking substrate, from a first state in which the emulsion is stable to a second state in which the emulsion is unstable and the discontinuous polymeric, film-forming phase rapidly agglomerates to form a film deposited on the surface of the conventional porous marking substrate with low adhesion thereto, said emulsion being an aqueous emulsion of carboxylated styrene-butadiene rubber latex characterized by a basic pH;

(b) a first colorant present in said emulsion, said first colorant being characterized by its association with said film when said emulsion is transformed into said second state, said first colorant being a water-soluble basic dye; and (c) a second colorant present in said emulsion and different in color from said first colorant, said second colorant being characterized both by its solubility in said continuous phase and by its lack of association with said film when said emulsion is transformed into said second state whereby, upon contact of said emulsion with the surface of the conventional porous marking substrate, said second colorant becomes absorbed by the conventional porous marking substram, said second colorant being a water-soluble acid dye.

4. The color-changeable marking composition as claimed in claim 1 wherein said composition further comprises an additive selected from the group consisting of humectants, preservatives, coalescing agents, plasticizers, antimicrobial agents, antifoam agents, anticorrosive agents, antioxidants, release agents, surfactants and viscosity adjusting agents.

5. A method of making a mark on a conventional porous marking substrate, said method comprising the steps of:

(a) applying a color-changeable marking composition on the surface of the conventional porous marking substrate, said color-changeable marking composition comprising (i) an emulsion, said emulsion comprising a discontinuous polymeric film-forming phase and a continuous phase, said emulsion being characterized by its ability to be transformed upon being contacted with the surface of a conventional porous marking substrate from a first state in which the emulsion is stable to a second state in which the emulsion is unstable and the discontinuous polymeric, film-forming phase rapidly agglomerates to form a film deposited on the surface of the conventional porous marking substrate with low adhesion thereto said emulsion being an aqueous emulsion of non- carboxylated styrene-butadiene rubber latex characterized by a basic pH, (ii) a first colorant present in said emulsion, said first colorant being characterized by its association with said film when said emulsion is transformed into said second state, said first colorant being a water-insoluble pigment, and (iii) a second colorant present in said emulsion and different in color from said first colorant, said second colorant being characterized both by its solubility in said continuous phase and by its lack of association with said film when said emulsion is transformed into said second state whereby, upon contact of said emulsion with the surface of the conventional porus marking substrate, said second colorant becomes absorbed by the conventional porous, marking substrate said second colorant being a water-soluble acid dye; and (b) removing the first colorant and not the second colorant from the conventional porous marking substrate using an ordinary pencil eraser.

6. A method of making a mark on a conventional porous marking substrate, said method comprising the steps of:

(a) applying a color-changeable marking composition on the surface of the conventional porous marking substrate, said color-changeable marking composition comprising
(i) an emulsion, said emulsion comprising a discontinuous polymeric phase and a continuous phase, said emulsion being characterized by its ability to be transformed, upon being contacted with the surface of a conventional porous marking substrate, from a first state in which the emulsion is stable to a second state in which the emulsion is unstable and the discontinuous polymeric phase rapidly agglomerates to form a deposit on the surface of the conventional porous marking substrate with low adhesion thereto, said emulsion being an aqueous emulsion of non-carboxylated styrene-butadine rubber latex characterized by a basic pH,
(ii) a first colorant present in said emulsion, said first colorant being characterized by its association with said deposit when said emulsion is transformed into said second state, said first colorant being a water soluble basic dye, and
(iii) a second colorant present in said emulsion and different in color from said first colorant, said second colorant being characterized both by its solubility in said continuous phase and by its lack of association with said deposit when said emulsion is transformed into said second state whereby, upon contact of said emulsion with the surface of the conventional porous marking substrate, said second colorant becomes absorbed by the conventional porous marking substrate, said second colorant being a water-soluble acid dye; and (b) removing the first colorant and not the second colorant from the conventional porous marking substrate using an ordinary pencil eraser.

* * * * *